United States Patent
Kaneko et al.

(10) Patent No.: US 10,645,258 B2
(45) Date of Patent: May 5, 2020

(54) MULTI-CAMERA SYSTEM, METHOD OF CONTROLLING A MULTI-CAMERA SYSTEM, AND CAMERA

(71) Applicant: SONY CORPORATION, Tokyo (JP)

(72) Inventors: Tetsuo Kaneko, Kanagawa (JP);
Kazuhiro Uchida, Kanagawa (JP);
Shigeo Nakatsuka, Tokyo (JP);
Shinnosuke Usami, Tokyo (JP);
Yasuhiro Iizuka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 15/772,743

(22) PCT Filed: Nov. 16, 2016

(86) PCT No.: PCT/JP2016/083970
§ 371 (c)(1),
(2) Date: May 1, 2018

(87) PCT Pub. No.: WO2017/086348
PCT Pub. Date: May 26, 2017

(65) Prior Publication Data
US 2019/0215420 A1  Jul. 11, 2019

(30) Foreign Application Priority Data

Nov. 17, 2015 (JP) ................. 2015-224498

(51) Int. Cl.
*H04N 5/12* (2006.01)
*G06T 3/40* (2006.01)
(Continued)

(52) U.S. Cl.
CPC ............ *H04N 5/12* (2013.01); *G06T 3/40* (2013.01); *G06T 3/4038* (2013.01); *H04N 5/06* (2013.01);
(Continued)

(58) Field of Classification Search
None
See application file for complete search history.

(56) References Cited

U.S. PATENT DOCUMENTS

| 4,860,101 | A | * | 8/1989 | Pshtissky | ............. | H04N 5/0733 348/518 |
| 5,243,425 | A | * | 9/1993 | Thompson | ............ | H04N 5/0733 348/500 |
| 6,795,124 | B1 | * | 9/2004 | Gamo | .................. | H04N 5/0733 348/521 |
| 8,159,559 | B2 | * | 4/2012 | Senba | ................ | H04N 5/23248 348/229.1 |

(Continued)

FOREIGN PATENT DOCUMENTS

| CN | 103516981 A | 1/2014 |
| JP | 60-259069 A | 12/1985 |

(Continued)

OTHER PUBLICATIONS

International Search Report and Written Opinion of PCT Application No. PCT/JP2016/083970, dated Jan. 31, 2017, 06 pages of ISRWO.

*Primary Examiner* — James M Hannett
(74) *Attorney, Agent, or Firm* — Chip Law Group

(57) ABSTRACT

Focal plane distortion is prevented from standing out in the vicinity of a joint when a plurality of captured images are stitched and synthesized. A plurality of cameras are provided. Each camera includes an image sensor that outputs a signal by a raster scan scheme. Phases of a vertical synchronization signal supplied to the image sensors of the plurality of cameras are respectively shifted according to information of gap amounts of captured images of the respective cameras from a reference position in a vertical direction. Even if there are gaps in the vertical direction between the installed cameras, positional gaps between the installed image sensors due to variations in individual camera main bodies, and the like, there are no lines with largely different capture times in the vicinity of a joint of a synthe- (Continued)

sized image, and focal plane distortion is prevented from standing out in the vicinity of this joint.

11 Claims, 11 Drawing Sheets

(51) Int. Cl.
    *H04N 5/06*          (2006.01)
    *H04N 5/247*        (2006.01)
    *H04N 5/232*        (2006.01)
    *H04N 7/18*          (2006.01)

(52) U.S. Cl.
    CPC ......... *H04N 5/23238* (2013.01); *H04N 5/247* (2013.01); *H04N 7/181* (2013.01)

(56) References Cited

U.S. PATENT DOCUMENTS

| | | | |
|---|---|---|---|
| 2012/0081519 A1* | 4/2012 | Goma | .................... H04N 5/247 |
| | | | 348/47 |
| 2013/0235149 A1 | 9/2013 | Tanaka et al. | |
| 2014/0002683 A1 | 1/2014 | Muraki et al. | |
| 2017/0214903 A1* | 7/2017 | Tadano | ................ H04N 5/2353 |

FOREIGN PATENT DOCUMENTS

| | | |
|---|---|---|
| JP | 11-261884 A | 9/1999 |
| JP | 2013-048333 A | 3/2013 |
| JP | 2013-214952 A | 10/2013 |
| JP | 2014-011529 A | 1/2014 |
| KR | 10-2014-0001740 A | 1/2014 |

\* cited by examiner

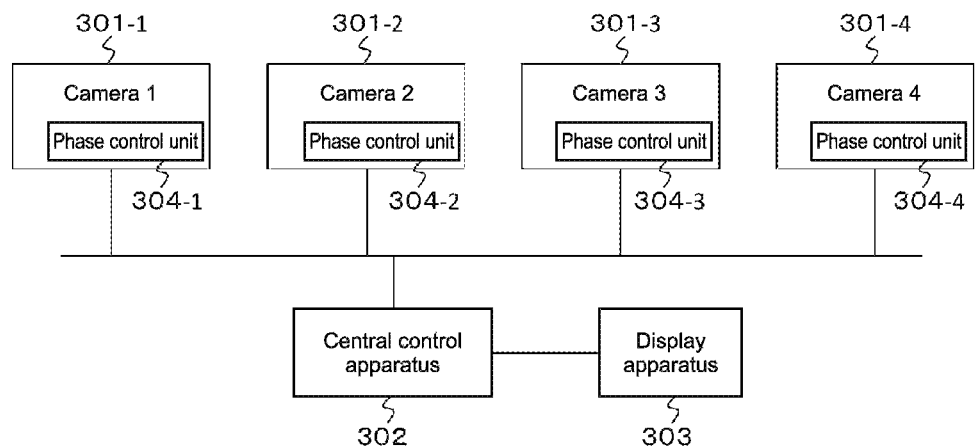
FIG.7
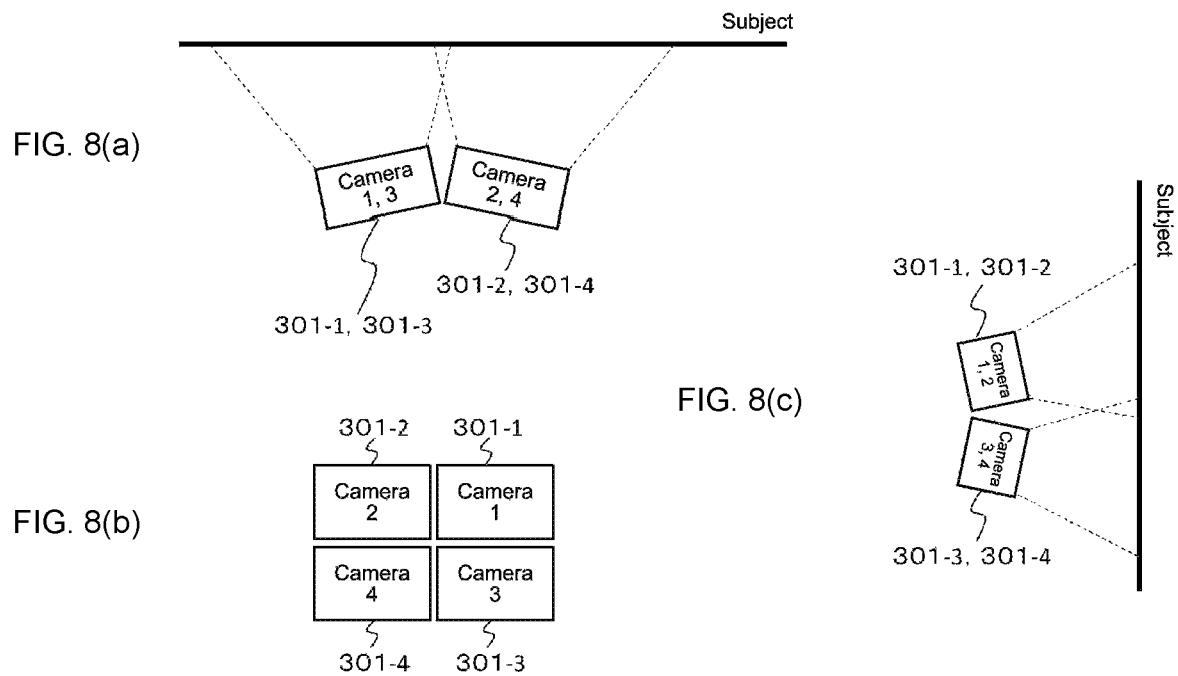
FIG. 8(a)
FIG. 8(b)
FIG. 8(c)

MULTI-CAMERA SYSTEM, METHOD OF CONTROLLING A MULTI-CAMERA SYSTEM, AND CAMERA

CROSS REFERENCE TO RELATED APPLICATIONS

This application is a U.S. National Phase of International Patent Application No. PCT/JP2016/083970 filed on Nov. 16, 2016, which claims priority benefit of Japanese Patent Application No. JP 2015-224498 filed in the Japan Patent Office on Nov. 17, 2015. Each of the above-referenced applications is hereby incorporated herein by reference in its entirety.

TECHNICAL FIELD

The present technology relates to a multi-camera system, a method of controlling a multi-camera system, and a camera. Specifically, the present technology relates to a multi-camera system configured by using a camera including an image sensor, the image sensor outputting a signal by a raster scan scheme, and the like.

BACKGROUND ART

In the past, a camera (video camera) using a CMOS image sensor (CMOS imager) has been known. It is known that the CMOS image sensor that outputs a signal by a raster scan scheme performs exposure in sequence by raster scanning, and thus focal plane distortion occurs. When cameras of this type are arranged in the horizontal direction for imaging, and images captured with the cameras are stitched to generate a panoramic image, if there are gaps in the vertical direction between the installed cameras, positional gaps between the installed imagers due to variations in individual camera main bodies, and the like, focal plane distortion stands out in the vicinity of a joint (boundary) of the images captured with the cameras.

Patent Literature 1 describes a video camera system in which a plurality of cameras are caused to operate in synchronization with a horizontal pulse and a vertical pulse, those pulses being different from each other in timings, and captured image data of the respective cameras are synthesized, thus enabling the images of the plurality of cameras to be monitored at the same time on a single monitor for image reproduction. Further, Patent Literature 2 describes the technology of providing, when a panoramic image is captured with a plurality of cameras, overlaps to images of adjacent cameras and enabling successive images to be viewed.

CITATION LIST

Patent Literature

Patent Literature 1: Japanese Patent Application Laid-open No. 60-259069
Patent Literature 2: Japanese Patent Application Laid-open No. 11-261884

DISCLOSURE OF INVENTION

Technical Problem

It is an object of the present technology to prevent focal plane distortion from standing out in the vicinity of a joint when a plurality of captured images are stitched and synthesized.

Solution to Problem

A concept of the present technology resides in a multi-camera system including: a plurality of cameras that respectively include image sensors, each of the image sensors outputting a signal by a raster scan scheme; and a plurality of phase control units that respectively shift phases of a vertical synchronization signal supplied to the image sensors of the plurality of cameras according to information of gap amounts of captured images of the respective cameras from a reference position in a vertical direction.

In the present technology, a plurality of cameras are provided. Each camera includes an image sensor that outputs a signal by a raster scan scheme, e.g., an image sensor that performs exposure in sequence by raster scanning, such as a CMOS image sensor. Phases of a vertical synchronization signal supplied to the image sensors of the plurality of cameras are respectively shifted by the plurality of phase control units according to information of gap amounts of captured images of the respective cameras from a reference position in a vertical direction.

For example, the plurality of phase control units may be configured to be respectively provided in the plurality of cameras. Further, for example, the plurality of phase control units may be configured to be respectively provided externally to the plurality of cameras. Further, for example, the multi-camera system may further include a central control unit that supplies, to the plurality of phase control units, the information of the gap amounts of the captured images of the plurality of cameras from the reference position in the vertical direction. In this case, for example, the central control unit may be configured to process the captured images of the plurality of cameras and obtain the information of the gap amounts of the captured images of the plurality of cameras from the reference position in the vertical direction. Further, in this case, for example, any of the plurality of phase control units may double as the central control unit.

Further, for example, the plurality of cameras may be four cameras, and the four cameras may be configured to be disposed in a two-by-two matrix including two cameras in a horizontal direction by two cameras in the vertical direction. Further, for example, the multi-camera system may further include an image processing unit that performs stitching processing on data of the captured images and obtains panoramic image data, the data of the captured images being output from the plurality of cameras.

In such a manner, in the present technology, the phases of the vertical synchronization signal supplied to the image sensors of the plurality of cameras are respectively shifted according to the information of the gap amounts of the captured images of the respective cameras from the reference position in the vertical direction. Therefore, when the plurality of captured images are stitched and synthesized, there are no lines with largely different capture times in the vicinity of a joint, and focal plane distortion is prevented from standing out in the vicinity of this joint.

Further, another concept of the present technology resides in a camera including: a plurality of image sensors that respectively output a signal by a raster scan scheme; and a phase control unit that shifts phases of a vertical synchronization signal supplied to the plurality of image sensors according to information of gap amounts of captured images of the respective image sensors from a reference position in a vertical direction.

In the present technology, a plurality of image sensors are provided. Each image sensor is one that outputs a signal by a raster scan scheme, e.g., one that performs exposure in sequence by raster scanning, such as a CMOS image sensor. Phases of a vertical synchronization signal supplied to the plurality of image sensors are respectively shifted by the phase control unit according to information of gap amounts of captured images of the respective image sensors from a reference position in a vertical direction.

In such a manner, in the present technology, the phases of the vertical synchronization signal supplied to the plurality of image sensors are respectively shifted according to the information of the gap amounts of the captured images of the respective image sensors from the reference position in the vertical direction. Therefore, when the plurality of captured images are stitched and synthesized, there are no lines with largely different capture times in the vicinity of a joint, and focal plane distortion is prevented from standing out in the vicinity of this joint.

Further, another concept of the present technology resides in a camera including: an image sensor that outputs a signal by a raster scan scheme; a first input unit that inputs a reference vertical synchronization signal; a second input unit that inputs phase shift amount information of the vertical synchronization signal; and a phase control unit that shifts a phase of the reference vertical synchronization signal on the basis of the phase shift amount information and supplies the resultant signal to the image sensor.

In the present technology, an image sensor that outputs a signal by a raster scan scheme, e.g., an image sensor that performs exposure in sequence by raster scanning, such as a CMOS image sensor, a first input unit that inputs a reference vertical synchronization signal, and a second input unit that inputs phase shift amount information of the vertical synchronization signal are provided. A phase of the reference vertical synchronization signal is shifted by the phase control unit on the basis of the phase shift amount information, and the resultant signal is supplied to the image sensor. In such a manner, in the present technology, it is possible to shift the phase of the reference vertical synchronization signal on the basis of the phase shift amount information and supply the resultant signal to the image sensor.

Advantageous Effects of Invention

According to the present technology, it is possible to prevent focal plane distortion from standing out in the vicinity of a joint when a plurality of captured images are stitched and synthesized. It should be noted that the effects described in this specification are merely exemplary ones and are not restrictive ones, and additional effects may be provided.

BRIEF DESCRIPTION OF DRAWINGS

FIG. 7 is a block diagram showing a configuration example of a multi-camera system as a second embodiment.

FIGS. 8(*a*), 8(*b*), and 8(*c*) are diagrams for describing the arrangement of cameras configuring the multi-camera system.

MODE(S) FOR CARRYING OUT THE INVENTION

Hereinafter, modes for carrying out the invention (hereinafter referred to as "embodiments") will be described. It should be noted that description will be given in the following order.

1. First Embodiment
2. Second Embodiment
3. Modified Example

1. First Embodiment

[Configuration Example of Multi-Camera System]

Figure 1:
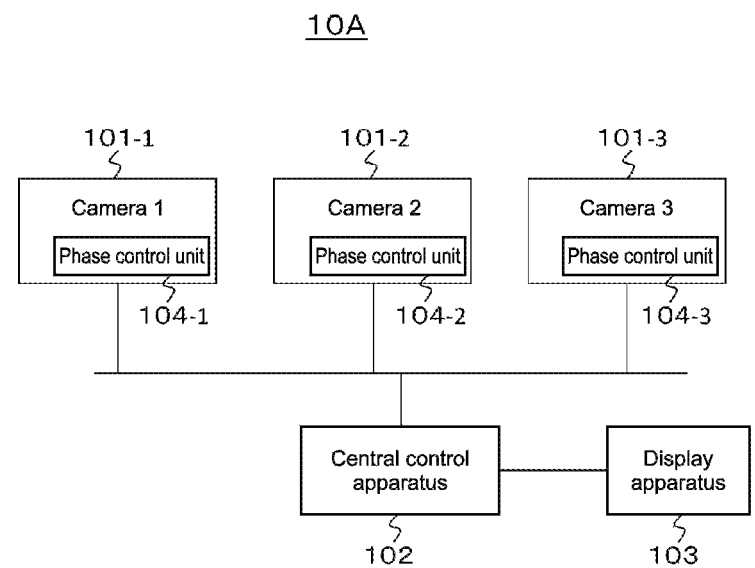
FIG. 1 is a block diagram showing a configuration example of a multi-camera system as a first embodiment.

FIG. 1 shows a configuration example of a multi-camera system 10A as a first embodiment. This multi-camera system 10A includes a plurality of, here, three cameras (video cameras), i.e., a camera (camera 1) 101-1, a camera (camera 2) 101-2, and a camera (camera 3) 101-3. Further, the multi-camera system 10A includes a central control apparatus 102 and a display apparatus 103.

Figure 2A:
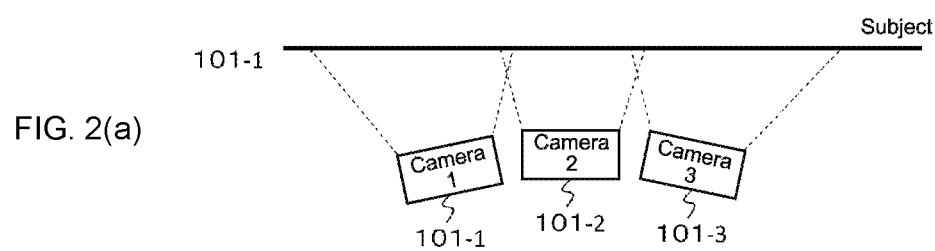
FIGS. 2(*a*) and 2(*b*) are diagrams for describing the arrangement of cameras configuring the multi-camera system.
Figure 2B:
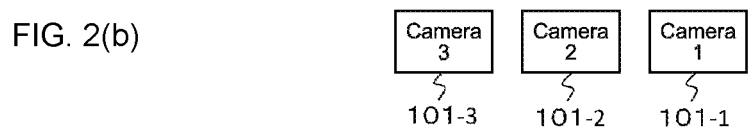

The cameras 101-1, 101-2, and 101-3 are disposed side by side in a horizontal direction. FIGS. 2(*a*) and 2(*b*) show a disposed state of the cameras 101-1, 101-2, and 101-3. FIG. 2(*a*) is a camera layout viewed from above, and FIG. 2(*b*) is a camera layout viewed from the front. As shown in FIG.

2(a), imaging is performed in the cameras such that overlaps are generated in captured images of the adjacent cameras.

Each of the cameras 101-1, 101-2, and 101-3 includes an image sensor (imager) that outputs a signal by a raster scan scheme, e.g., a CMOS image sensor. Further, the cameras 101-1, 101-2, and 101-3 include phase control units 104-1, 104-2, and 104-3, respectively.

Each of the phase control units 104-1, 104-2, and 104-3 shifts the phase of a vertical synchronization signal supplied to the image sensor according to information of a gap amount of a captured image of the corresponding camera from a reference position in a vertical direction. For example, any position of the captured images of the cameras 101-1, 101-2, and 101-3 is set as a reference position. In this case, each of the phase control units 104-1, 104-2, and 104-3 performs phase shift processing on a reference vertical synchronization signal such as a genlock signal and then supplies the resultant signal to the image sensor. Here, the position of the captured image of each camera is set as, for example, the position of an initial line (first line), and information of a gap amount is given by the number of lines.

The central control apparatus 102 provides each of the phase control units 104-1, 104-2, and 104-3 with information of a gap amount of a captured image of a corresponding camera from a reference position in a vertical direction. For example, the central control apparatus 102 processes an image (captured image) obtained by imaging an identical subject such as a checker pattern for calibration with each camera and calculates a gap amount of the captured image of each camera from the reference position in the vertical direction.

It should be noted that the central control apparatus 102 may possibly obtain information of a gap amount of an image captured with each camera from a reference position in a vertical direction, on the basis of the operation of adjusting the gap amount by a user viewing a panoramic image that has been subjected to stitching processing. In this case, the user adjusts the gap amount such that focal plane distortion does not stand out in the vicinity of a joint.

Further, the central control apparatus 102 performs stitching processing on the captured image data output from the cameras 101-1, 101-2, and 101-3 and obtains panoramic image data. The display apparatus 103 displays a panoramic image on the basis of the panoramic image data obtained in the central control apparatus 102. The display apparatus 103 is, for example, a head mounted display or a personal computer.

Figure 3:
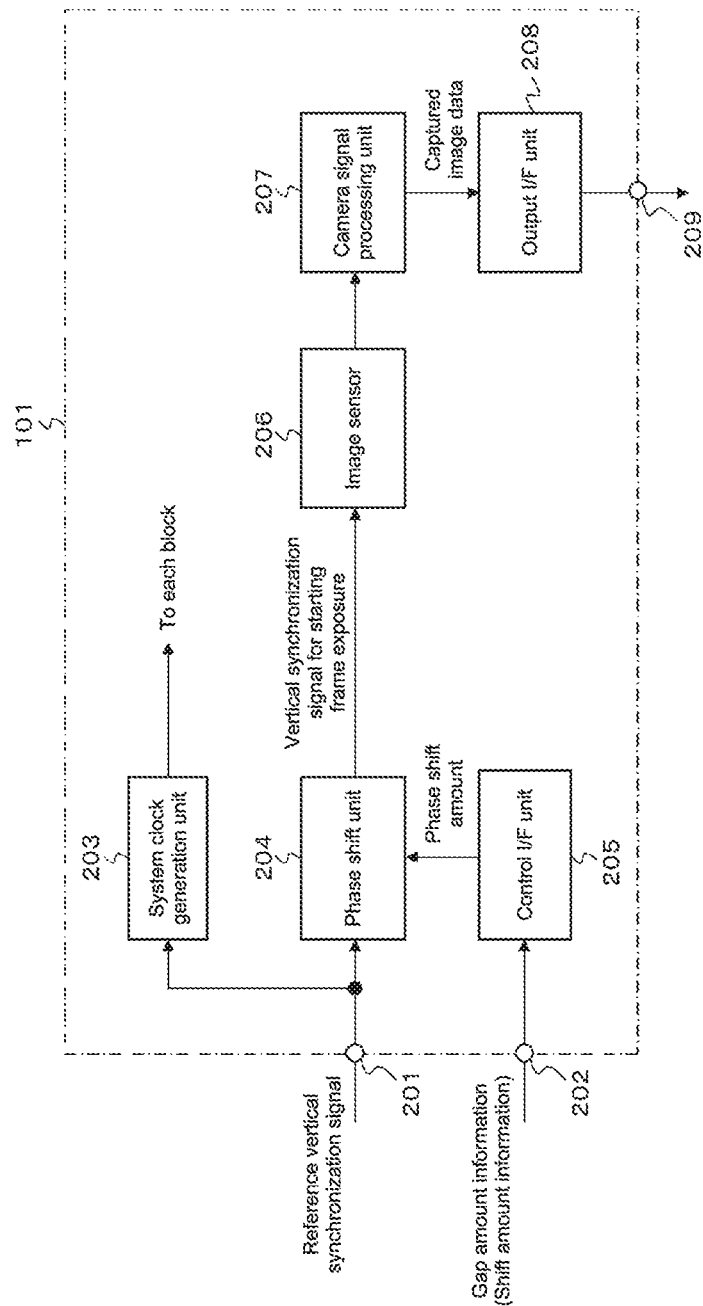
FIG. 3 is a block diagram showing a configuration example of the camera.

FIG. 3 shows a configuration example of the camera 101 (camera 101-1, 101-2, or 101-3). The camera 101 includes an input terminal 201, an input terminal 202, a system clock generation unit 203, a phase shift unit 204, a control I/F unit 205, an image sensor 206, a camera signal processing unit 207, an output interface unit 208, and a captured image data output terminal 209. The image sensor 206 is an image sensor that outputs a signal by a raster scan scheme, e.g., a CMOS image sensor.

The input terminal 201 is a terminal for inputting a reference vertical synchronization signal such as a genlock signal. The system clock generation unit 207 refers to the reference vertical synchronization signal and generates a system clock that is synchronized with the reference vertical synchronization signal. This system clock is supplied to each block within the camera 102.

The input terminal 202 is a terminal for inputting gap amount information (shift amount information) of a captured image from the reference position in the vertical direction. As described above, the gap amount information is given by the number of lines, for example. The control I/F unit 205 converts the gap amount information, which is based on the number of lines, into a phase shift amount represented by, for example, the number of clocks of a predetermined frequency, for example, 100 MHz, and supplies the resultant information to the phase shift unit 204.

The phase shift unit 204 shifts the phase of the reference vertical synchronization signal by the phase shift amount supplied from the control I/F unit 205. The phase shift unit 204 then supplies the vertical synchronization signal whose phase is shifted as described above, as a vertical synchronization signal for starting frame exposure, to the image sensor 206. Here, the phase shift unit 204 and the control I/F unit 205 configure the phase control unit 104 (phase control unit 104-1, 104-2, or 104-3).

The camera signal processing unit 207 performs conventionally-known camera signal processing on an output signal of the image sensor 206 and obtains captured image data. The captured image data is output to the output terminal 209 via the output I/F unit 208. For example, the output I/F unit 208 is an HDMI interface unit, a USB interface unit, or the like.

Figure 4:
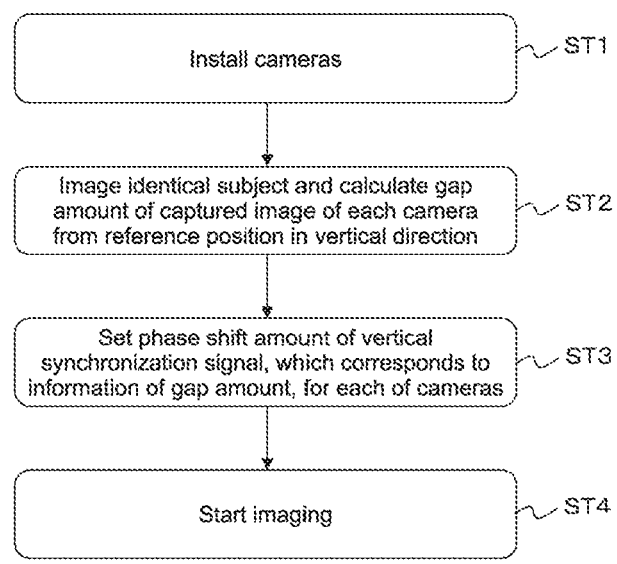
FIG. 4 is a diagram showing a flow from the installation of the cameras to the start of imaging in the multi-camera system.

FIG. 4 shows a flow from the installation of the cameras 101-1, 101-2, and 101-3 to the start of imaging in the multi-camera system 10A shown in FIG. 1. In Step ST1, a user installs the cameras 101-1, 101-2, and 101-3.

Next, in Step ST2, each of the cameras 101-1, 101-2, and 101-3 images an identical subject such as a checker pattern for calibration. A captured image of each camera is supplied to the central control apparatus 102. The central control apparatus 102 processes the captured image of each camera and calculates a gap amount of the captured image of each camera from the reference position in the vertical direction. Information of the gap amount of the captured image of each camera from the reference position in the vertical direction, the gap amount being calculated by the central control apparatus 102, is supplied to a corresponding camera.

Next, in Step ST3, a phase shift amount of the vertical synchronization signal, which corresponds to the information of the gap amount, is set for each of the cameras. In this case, in each camera, the information of the gap amount is converted into the phase shift amount by the control I/F unit 205, and the phase shift amount is supplied to the phase shift unit 204. The vertical synchronization signal supplied to the image sensor 206 is obtained by shifting the phase of the reference vertical synchronization signal by the phase shift amount.

Next, in Step ST4, the central control apparatus 102 transmits an instruction to start imaging, or the like, to each camera via a control I/F not shown in the figure according to a user operation to start imaging, for example. The camera receives this instruction and starts imaging. The central control apparatus 102 performs stitching processing on captured image data output from the cameras 101-1, 101-2, and 101-3, obtains panoramic image data, and supplies the panoramic image data to the display apparatus 103. As a result, the display apparatus 103 can display an image based on the panoramic image data.

As described above, in the multi-camera system 10A shown in FIG. 1, the phases of the vertical synchronization signal supplied to the image sensors 206 of the cameras 101-1, 101-2, and 101-3 are respectively shifted according to the information of the gap amounts of the captured images of the respective cameras from the reference position in the vertical direction.

Therefore, even if there are gaps in the vertical direction between the installed cameras, positional gaps between the installed image sensors due to variations in individual camera main bodies, and the like, when the captured images are stitched and then synthesized, there are no lines with largely different capture times in the vicinity of a joint, focal plane distortion is prevented from standing out in the vicinity of this joint, and a favorable panoramic image is obtained. Further, stitching can be favorably performed even when the accuracy of the installation of the cameras is not high, and thus cost for rigs or installation can be reduced.

Figure 5A:
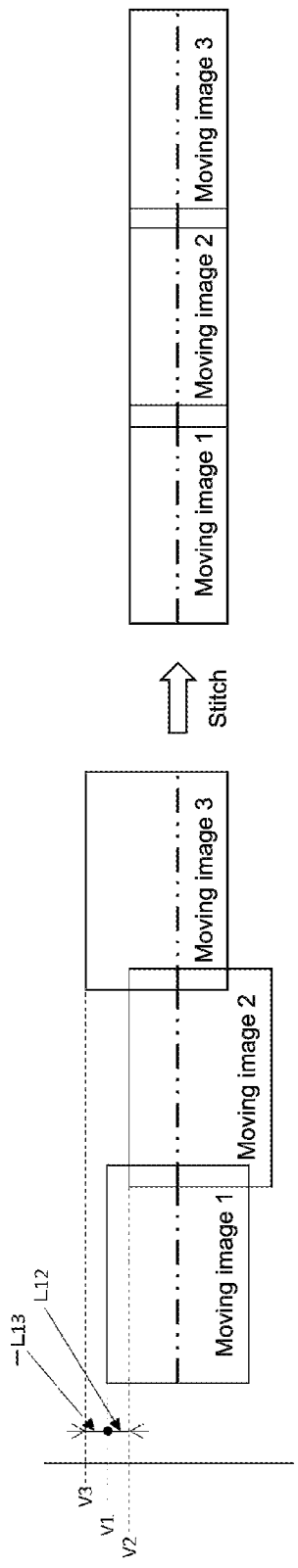
FIGS. 5(*a*) and 5(*b*) are diagrams for describing that focal plane distortion can be prevented from standing out in the vicinity of joints of a synthesized image by shifting the phases of a vertical synchronization signal supplied to image sensors of the respective cameras according to information of gap amounts of captured images from a reference position in a vertical direction.

The left side of FIG. 5(a) shows an example of the captured images of the cameras 101-1, 101-2, and 101-3. A "moving image 1" is a captured image of the camera 101-1, a "moving image 2" is a captured image of the camera 101-2, and a moving image 3" is a captured image of the camera 101-3. Because of gaps in the vertical direction between the installed cameras, positional gaps between the installed image sensors due to variations in individual camera main bodies, and the like, the captured images of the respective cameras have gaps in the vertical direction.

"V1" represents a position of the captured image of the camera 101-1 in the vertical direction, "V2" represents a position of the captured image of the camera 101-2 in the vertical direction, and "V3" represents a position of the captured image of the camera 101-3 in the vertical direction. Further, "L12" represents a gap amount of the position of the captured image of the camera 101-2 with the position of the captured image of the camera 101-1 being as a reference position. "–L13" represents a gap amount of the position of the captured image of the camera 101-3 with the position of the captured image of the camera 101-1 being as a reference position.

The phases of the vertical synchronization signal supplied to the image sensors 206 of the cameras 101-1, 101-2, and 101-3 are respectively shifted according to the information of the gap amounts of the captured images of the respective cameras from the reference position in the vertical direction. Thus, lines captured at an identical time in the respective captured images become lines at an identical position or extremely close positions in the vertical direction as indicated by alternate long and short dashed lines. Therefore, when the captured images are stitched and synthesized, focal plane distortion is prevented from standing out in the vicinity of joints. The right side of FIG. 5(a) shows an example of a panoramic image after the captured images are stitched and synthesized.

Figures 6A, 6B:
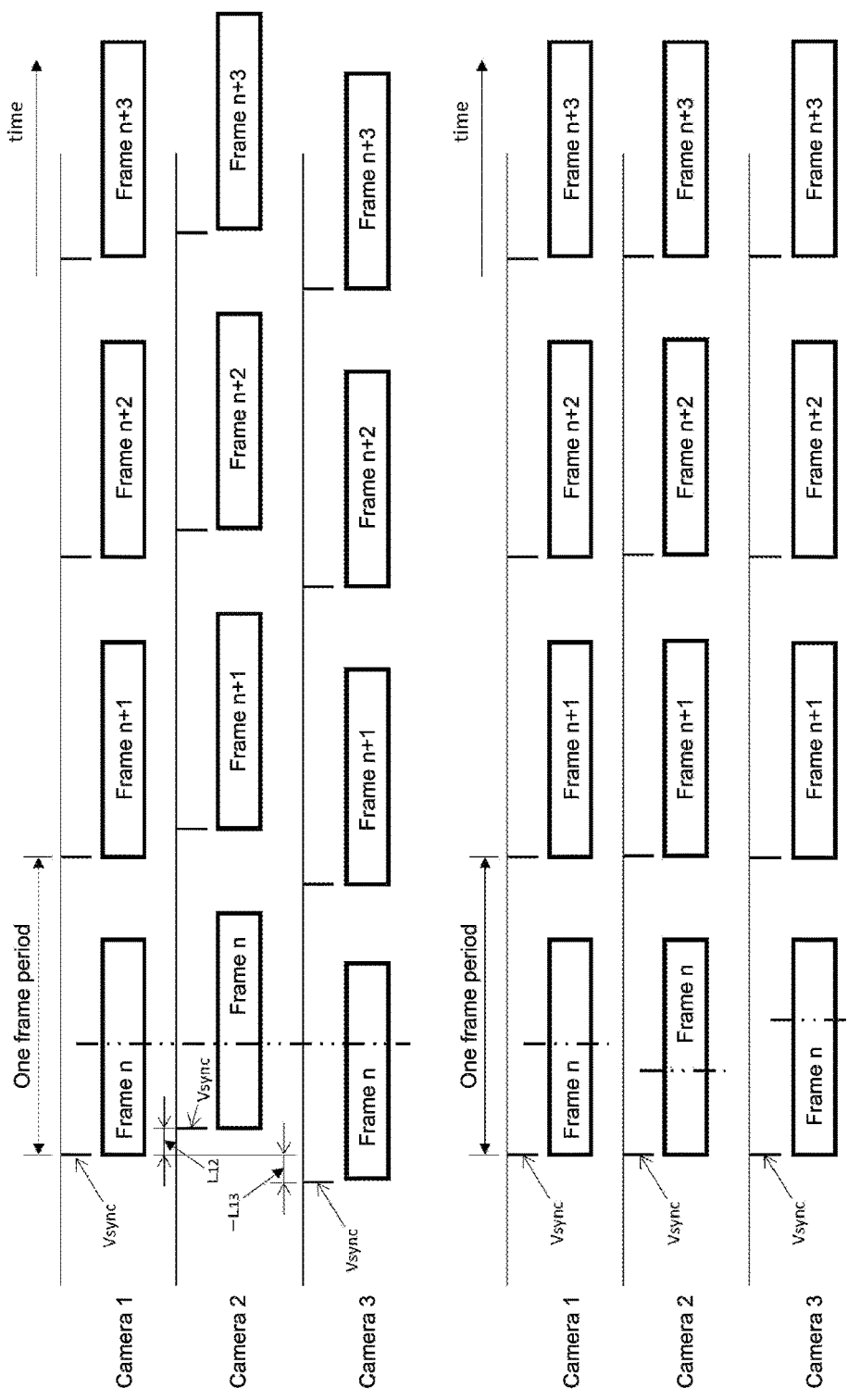
FIGS. 6(*a*) and 6(*b*) are diagrams for describing that focal plane distortion can be prevented from standing out in the vicinity of joints of a synthesized image by shifting the phases of a vertical synchronization signal supplied to image sensors of the respective cameras according to information of gap amounts of captured images from a reference position in a vertical direction.

FIG. 6(a) shows a frame exposure timing chart of the cameras when the phases of a vertical synchronization signal Vsync supplied to the image sensors 206 of the respective cameras are respectively shifted according to the information of the gap amounts of the captured images of the respective cameras from the reference position in the vertical direction, in a case where the captured images of the cameras 101-1, 101-2, and 101-3 have gaps in the vertical direction. In this case, in the captured images, lines at an identical position or extremely close positions in the vertical direction are captured at an identical time as indicated by alternate long and short dashed lines. This means that, as described above, lines captured at an identical time in the respective captured images become lines at an identical position or extremely close positions in the vertical direction.

Figure 5B:
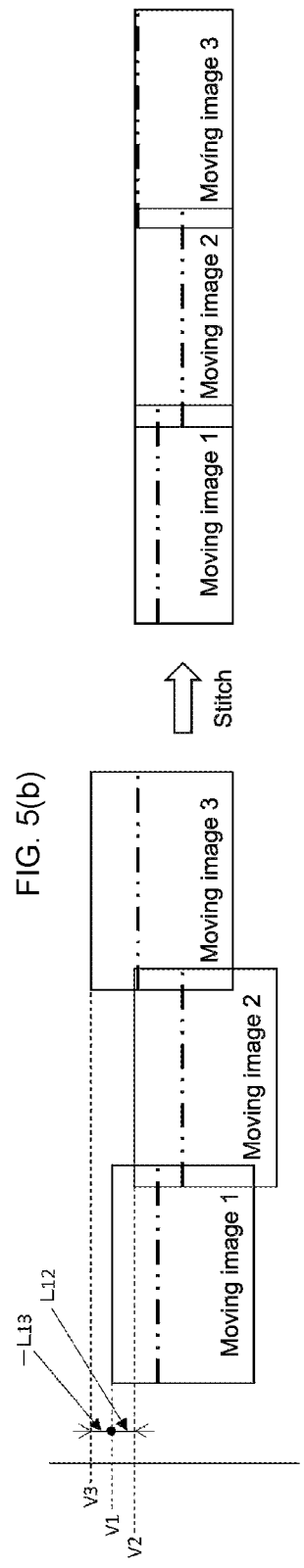

It should be noted that the left side of FIG. 5(b) also shows an example of the captured images of the cameras 101-1, 101-2, and 101-3 in a similar manner to the left side of FIG. 5(a). In a case where the phases of the vertical synchronization signal supplied to the image sensors 206 of the cameras 101-1, 101-2, and 101-3 are matched with one another, lines captured at an identical time in the respective captured images become lines at separate positions as indicated by alternate long and short dashed lines. Therefore, when the captured images are stitched and synthesized, focal plane distortion stands out in the vicinity of joints. The right side of FIG. 5(b) shows an example of a panoramic image after the captured images are stitched and synthesized.

FIG. 6(b) shows a frame exposure timing chart of the cameras when the phases of the vertical synchronization signal Vsync supplied to the image sensors 206 of the respective cameras are matched with one another, in a case where the captured images of the cameras 101-1, 101-2, and 101-3 have gaps in the vertical direction. In this case, in the captured images, lines at an identical position or extremely close positions in the vertical direction are captured at separate times as indicated by alternate long and short dashed lines. This means that, as described above, lines captured at an identical time in the respective captured images become lines at separate positions.

2. Second Embodiment

[Configuration Example of Multi-Camera System]

FIG. 7 shows a configuration example of a multi-camera system 10B as a second embodiment. This multi-camera system 10B includes four cameras (video cameras), i.e., a camera (camera 1) 301-1, a camera (camera 2) 301-2, a camera (camera 3) 301-3, and a camera (camera 4) 301-4. Further, the multi-camera system 10B includes a central control apparatus 302 and a display apparatus 103. Here, the camera is a 4K camera for obtaining 4K image data.

The cameras 301-1, 301-2, 301-3, and 301-4 are disposed in a two-by-two matrix including two cameras in the horizontal direction by two cameras in the vertical direction. FIGS. 8(a), 8(b), and 8(c) show a disposed state of the cameras 301-1, 301-2, 301-3, and 301-4. FIG. 8(a) is a camera layout viewed from above, FIG. 8(b) is a camera layout viewed from the front, and FIG. 8(c) is a camera layout viewed from the lateral side. As shown in FIGS. 8(a) and 8(c), imaging is performed in the cameras such that overlaps are generated in captured images of the adjacent cameras.

Each of the cameras 301-1, 301-2, 301-3, and 301-4 includes an image sensor that outputs a signal by a raster scan scheme, e.g., a CMOS image sensor. Further, the cameras 301-1, 301-2, 301-3, and 301-4 include phase control units 304-1, 304-2, 304-3, and 304-4, respectively.

Each of the phase control units 304-1, 304-2, 304-3, and 304-4 shifts the phase of a vertical synchronization signal supplied to the image sensor according to information of a gap amount of a captured image of the corresponding camera from a reference position in a vertical direction. For example, any position of the captured images of the cameras 301-1, 301-2, 301-3, and 301-4 is set as a reference position.

In this case, each of the phase control units 304-1, 304-2, 304-3, and 304-4 performs phase shift processing on a reference vertical synchronization signal such as a genlock signal and then supplies the resultant signal to the image sensor. Here, the position of the captured image of each camera is set as, for example, the position of an initial line (first line), and information of a gap amount is given by the number of lines. Although detailed description will be omitted, the cameras 301-1, 301-2, 301-3, and 301-4 have a similar configuration to that of the cameras in the multi-camera system 10A described above (see FIG. 3).

The central control apparatus 302 provides each of the phase control units 304-1, 304-2, 304-3, and 304-4 with information of a gap amount of an image captured with a corresponding camera from a reference position in a vertical direction. For example, the central control apparatus 302 processes an image (captured image) obtained by imaging an identical subject such as a checker pattern for calibration with each camera and calculates information of a gap amount of the image of each camera from the reference position in the vertical direction.

It should be noted that the central control apparatus 302 may possibly obtain information of the gap amount of the image captured with each camera from the reference position in the vertical direction, on the basis of the operation of adjusting the gap amount by a user viewing an 8K image that has been subjected to stitching processing. In this case, the user adjusts the gap amount such that focal plane distortion does not stand out in the vicinity of joints.

Further, the central control apparatus 302 performs stitching processing on captured image data of 4K, which are output from the cameras 304-1, 304-2, 304-3, and 304-4, and obtains 8K image data. The display apparatus 303 displays an 8K image or a selected part of the image on the basis of the 8K image data obtained in the central control apparatus 302. The display apparatus 303 is, for example, a head mounted display or a personal computer.

In the multi-camera system 10B shown in FIG. 7, details description of the flow from the installation of the cameras 304-1, 304-2, 304-3, and 304-4 to the start of imaging will be omitted, but the flow is similar to the flow in the multi-camera system 10A shown in FIG. 1 (see FIG. 4).

As described above, in the multi-camera system 10B shown in FIG. 7, the phases of the vertical synchronization signal supplied to the image sensors 206 of the cameras 304-1, 304-2, 304-3, and 304-4 are respectively shifted according to the information of the gap amounts of the captured images of the respective cameras from the reference position in the vertical direction.

Therefore, even if there are gaps in the vertical direction between the installed cameras, positional gaps between the installed image sensors due to variations in individual camera main bodies, and the like, when the captured images are stitched and then synthesized, there are no lines with largely different capture times in the vicinity of joints, focal plane distortion is prevented from standing out in the vicinity of those joints, and a favorable 8K image is obtained. Further, stitching can be favorably performed even when the accuracy of the installation of the cameras is not high, and thus cost for rigs or installation can be reduced.

Figure 9:
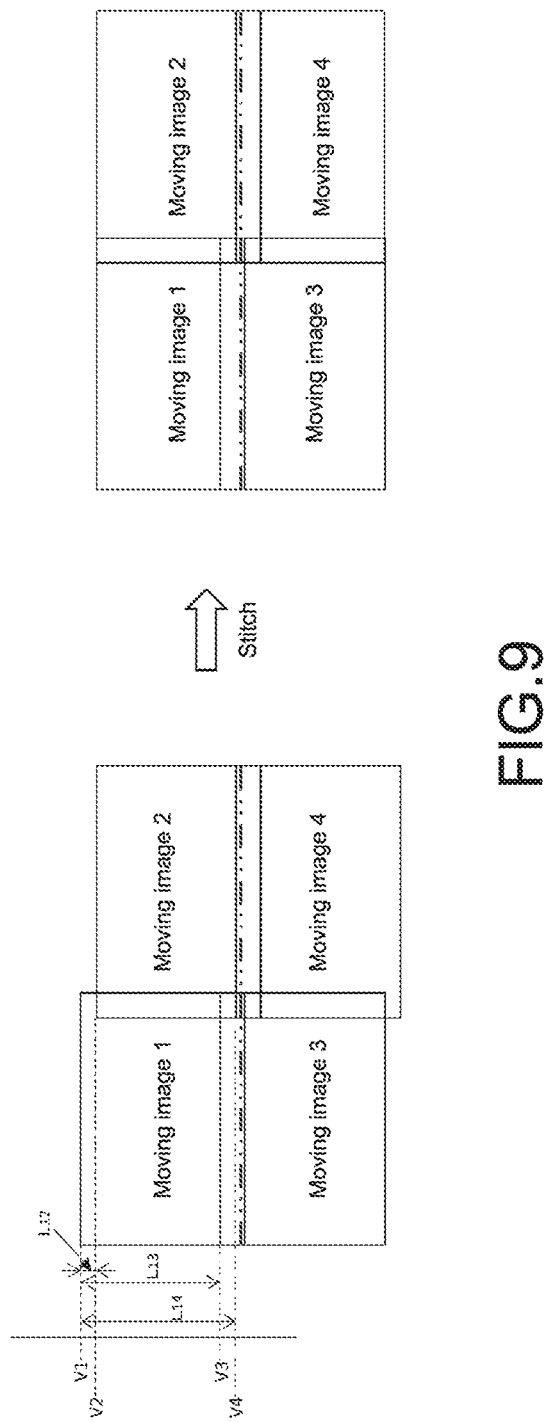
FIG. 9 is a diagram for describing that focal plane distortion can be prevented from standing out in the vicinity of joints of a synthesized image by shifting the phases of a vertical synchronization signal supplied to image sensors of the respective cameras according to information of gap amounts of captured images from a reference position in a vertical direction.

The left side of FIG. 9 shows an example of the captured images of the cameras 304-1, 304-2, 304-3, and 304-4. A "moving image 1" is a captured image of the camera 301-1, a "moving image 2" is a captured image of the camera 301-2, a moving image 3" is a captured image of the camera 301-3, and a moving image 4" is a captured image of the camera 301-4.

Because of gaps in the vertical direction between the installed cameras, positional gaps between the installed image sensors due to variations in individual camera main bodies, and the like, the captured images of the respective cameras have gaps in the vertical direction. "V1" represents a position of the captured image of the camera 301-1 in the vertical direction, "V2" represents a position of the captured image of the camera 301-2 in the vertical direction, "V3" represents a position of the captured image of the camera 301-3 in the vertical direction, and "V4" represents a position of the captured image of the camera 301-4 in the vertical direction.

Further, "L12" represents a gap amount of the position of the captured image of the camera 301-2 with the position of the captured image of the camera 301-1 being as a reference position. "L13" represents a gap amount of the position of the captured image of the camera 301-3 with the position of the captured image of the camera 301-1 being as a reference position. "L14" represents a gap amount of the position of the captured image of the camera 301-4 with the position of the captured image of the camera 301-1 being as a reference position.

The phases of the vertical synchronization signal supplied to the image sensors 206 of the cameras 304-1, 304-2, 304-3, and 304-4 are respectively shifted according to the information of the gap amounts of the captured images of the respective cameras from the reference position in the vertical direction. Thus, lines captured at an identical time in the respective captured images become lines at an identical position or extremely close positions in the vertical direction as indicated by alternate long and short dashed lines. Therefore, when the captured images are stitched and synthesized, focal plane distortion is prevented from standing out in the vicinity of joints. The right side of FIG. 9 shows an example of an image after the captured images are stitched and synthesized.

Figure 10:
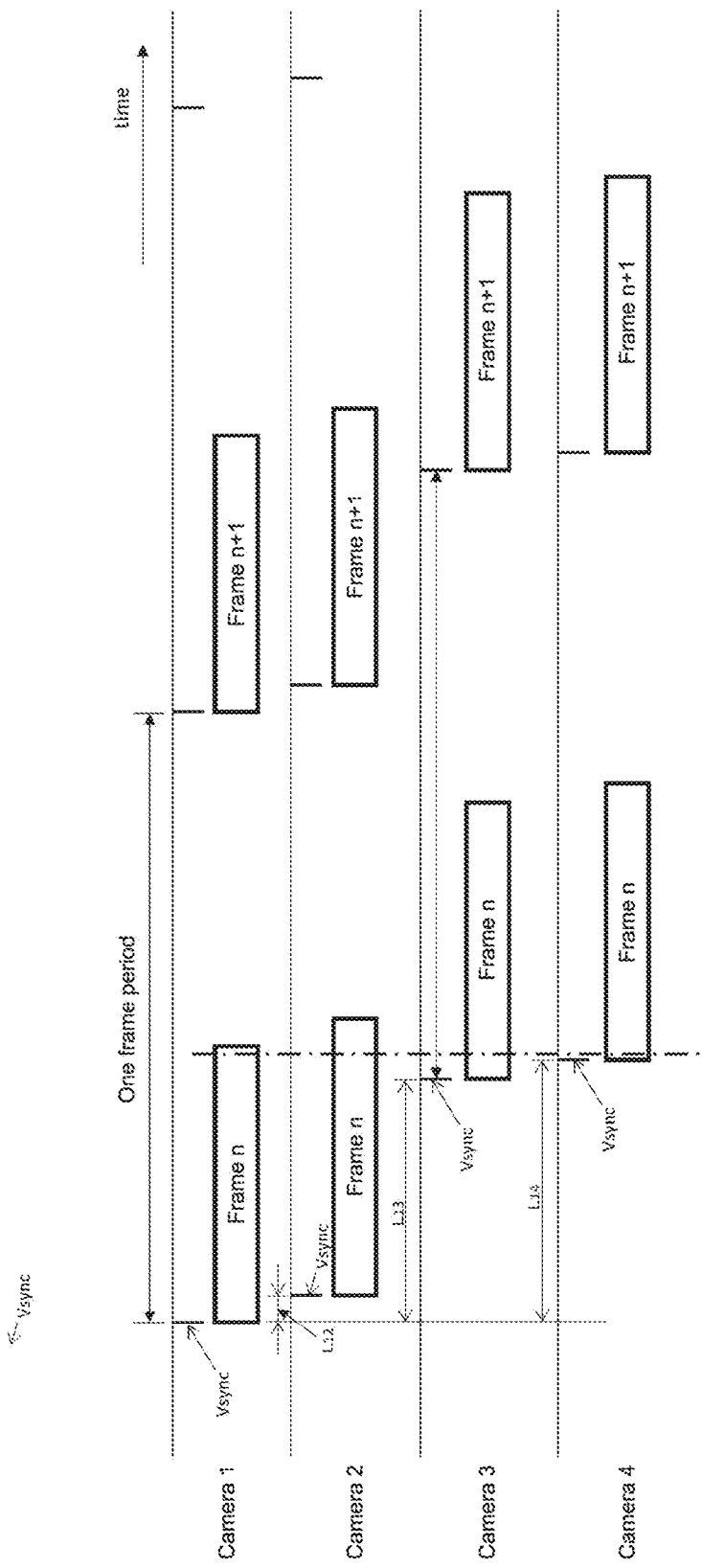
FIG. 10 is a diagram for describing that focal plane distortion can be prevented from standing out in the vicinity of joints of a synthesized image by shifting the phases of a vertical synchronization signal supplied to image sensors of the respective cameras according to information of gap amounts of captured images from a reference position in a vertical direction.

FIG. 10 shows a frame exposure timing chart of the cameras when the phases of a vertical synchronization signal Vsync supplied to the image sensors 206 of the respective cameras are respectively shifted according to the information of the gap amounts of the captured images of the respective cameras from the reference position in the vertical direction, in a case where the captured images of the cameras 304-1, 304-2, 304-3, and 304-4 have gaps in the vertical direction. In this case, in the captured images, lines at an identical position or extremely close positions in the vertical direction are captured at an identical time as indicated by alternate long and short dashed lines. This means that, as described above, lines captured at an identical time in the respective captured images become lines at an identical position or extremely close positions in the vertical direction.

As described above, the example of the multi-camera system 10B shown in FIG. 7, in which imaging is performed with the four 4K cameras and an 8K image (image data) is obtained, has been described. Although detailed description will be omitted, an example in which imaging is performed with four HD cameras and a 4K image is obtained can also be configured in a similar manner. Further, similarly, the present technology can also be applied to an example in which not only four cameras but also many more cameras are disposed in a matrix and a high-resolution image is obtained.

3. Modified Example

It should be noted that the above embodiments have described the example in which the phase control unit is provided within each camera, the phase control unit shifting the phase of the vertical synchronization signal supplied to the image sensor according to the information of the gap amount of the captured image of the camera from the reference position in the vertical direction. However, it is also conceivable that the camera does not include the phase control unit and the phase control unit is provided to the outside of the camera.

Figure 11:
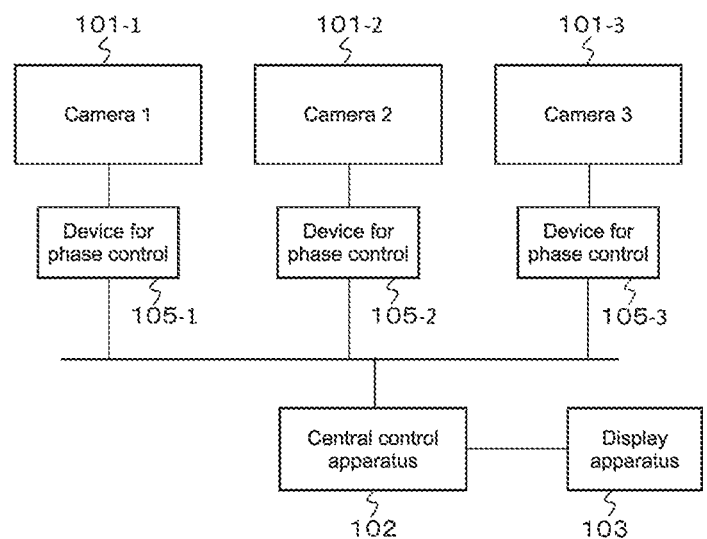
FIG. 11 is a block diagram showing another configuration example of the multi-camera system.

FIG. 11 shows a configuration example of a multi-camera system 10C in such a case. In FIG. 11, portions corresponding to those of FIG. 1 are denoted by identical reference symbols, and detailed description thereof will be omitted appropriately. The cameras 101-1, 101-2, and 101-3 do not include the phase control units 104-1, 104-2, and 104-3, respectively, unlike the multi-camera system 10A shown in FIG. 1.

Devices for phase control 105-1, 105-2, and 105-3 having similar functions to the phase control units 104-1, 104-2, and 104-3 are respectively provided outside the cameras 101-1, 101-2, and 101-3. The device for phase control 105 (device for phase control 105-1, 105-2, or 105-3) has functional units corresponding to, for example, the system clock generation unit 203, the phase shift unit 204, and the control I/F unit 205 included in the configuration of the camera 101 shown in FIG. 3.

The multi-camera system 10C shown in FIG. 11 also operates in a similar manner to the multi-camera system 10A shown in FIG. 1, and the phases of the vertical synchronization signal supplied to the image sensors 206 of the cameras 101-1, 101-2, and 101-3 are respectively shifted according to the information of the gap amounts of the captured images of the respective cameras from the reference position in the vertical direction. It should be noted that the multi-camera system 10C shown in FIG. 11 corresponds to the multi-camera system 10A shown in FIG. 1, but the multi-camera system 10C can also be configured to correspond to the multi-camera system 10B shown in FIG. 7 in a similar manner as a matter of course.

Further, the above embodiments have described the example including the central control apparatus, the central control apparatus supplying, to the phase control units of the plurality of cameras, the information of the gap amounts of the captured images of the respective cameras from the reference position in the vertical direction. However, it is also conceivable that the central control apparatus is not provided and any of the plurality of phase control units (cameras) doubles as the central control apparatus.

Figure 12:
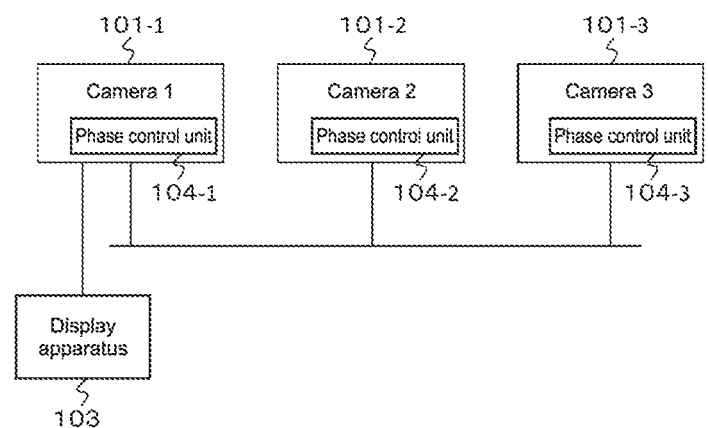
FIG. 12 is a block diagram showing another configuration example of the multi-camera system.

FIG. 12 shows a configuration example of a multi-camera system 10D in such a case. In FIG. 12, portions corresponding to those of FIG. 1 are denoted by identical reference symbols, and detailed description thereof will be omitted appropriately. The phase control unit 104-1 of the camera 101-1 doubles as the central control apparatus 102 in the multi-camera system 10A shown in FIG. 1, i.e., has the function of this central control apparatus 102.

In the multi-camera system 10D shown in FIG. 12, information of a gap amount of each captured image from the reference position in the vertical direction is given from the phase control unit 104-1 of the camera 101-1 to each of the phase control units 104-2 and 104-3 of the cameras 101-2 and 101-3. As a result, the multi-camera system 10D shown in FIG. 12 also operates in a similar manner to the multi-camera system 10A shown in FIG. 1, and the phases of the vertical synchronization signal supplied to the image sensors 206 of the cameras 101-1, 101-2, and 101-3 are respectively shifted according to the information of the gap amounts of the captured images of the respective cameras from the reference position in the vertical direction.

Figure 13:
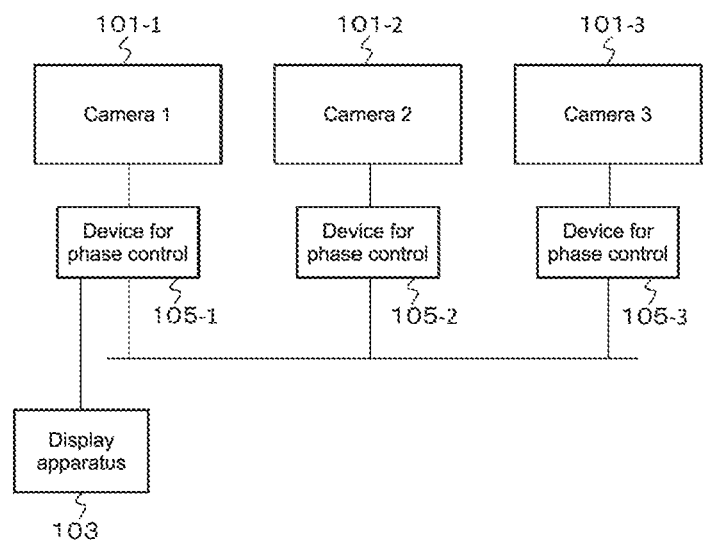
FIG. 13 a block diagram showing another configuration example of the multi-camera system.

It should be noted that the multi-camera system 10D shown in FIG. 12 corresponds to the multi-camera system 10A shown in FIG. 1, but the multi-camera system 10D can also be configured to correspond to the multi-camera system 10B shown in FIG. 7 in a similar manner as a matter of course. Further, the multi-camera system 10D can also be configured to correspond to the multi-camera system 10C shown in FIG. 11 in a similar manner. Although detailed description will be omitted, FIG. 13 shows a configuration example of a multi-camera system 10E in such a case.

Further, the embodiments described above have shown that the connection between the cameras or the connection with the central control apparatus are performed by wired connection, but wireless connection may be performed. Further, the same holds true for the connection between a camera and an externally-provided device for phase control.

Further, the embodiments described above have shown the example of the multi-camera system including the plurality of cameras, but the present technology can also be applied to a multi-eye camera including a plurality of image sensors.

Figure 14:
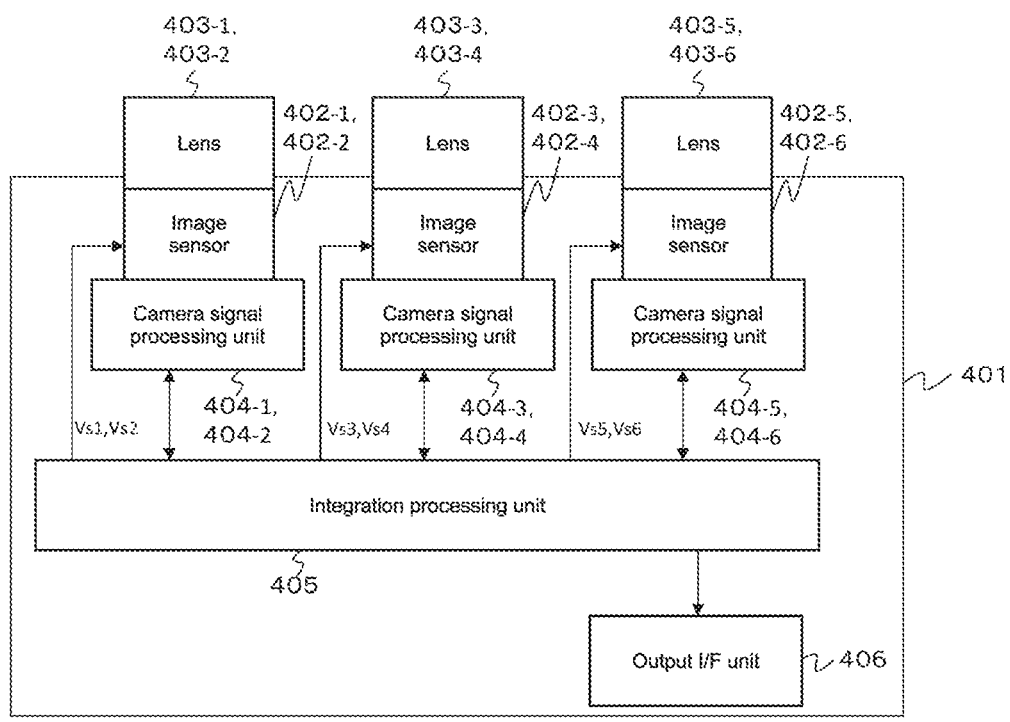
FIG. 14 is a block diagram showing a configuration example of a multi-eye camera.

FIG. 14 shows a configuration example of a multi-eye camera 10F. This multi-eye camera 10F includes a plurality of, here, six image sensors (imagers) 402-1 to 402-6 within a casing 401. The image sensors 402-1 to 402-6 are disposed in a matrix including three cameras in the horizontal direction by two cameras in the vertical direction. Each of the image sensors 402-1 to 402-6 is an image sensor that outputs a signal by a raster scan scheme, e.g., a CMOS image sensor.

Figure 15B:
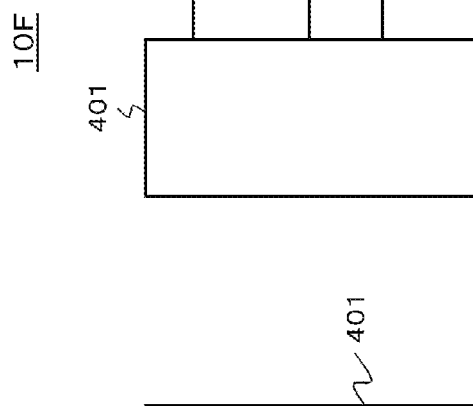
FIGS. 15(*a*) and 15(*b*) are front views and side view of the multi-eye camera.
Figure 15A:
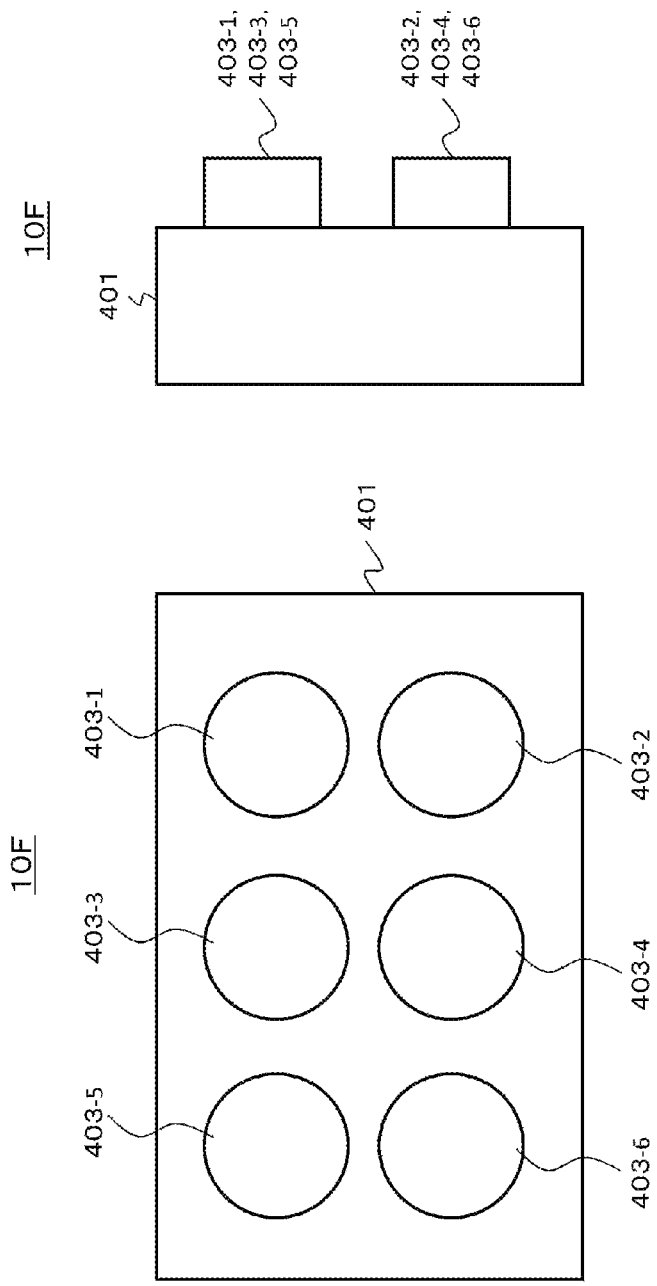

Lenses 403-1 to 403-6 are respectively arranged to correspond to the image sensors 402-1 to 402-6 in the casing 401. FIG. 15(*a*) is a front view of the multi-eye camera 10F, and FIG. 15(*b*) is a side view of the multi-eye camera 10F. In a similar manner to the multi-camera system 10B shown in FIG. 7, imaging is performed in each image sensor such that overlaps are generated in captured images of the adjacent image sensors.

Referring back to FIG. 14, the multi-eye camera 10F includes camera signal processing units 404-1 to 404-6, an integration processing unit 405, and an output I/F unit 406 within the casing 401, the camera signal processing units 404-1 to 404-6 respectively corresponding to the image sensors 402-1 to 402-6. The camera signal processing units 404-1 to 404-6 perform conventionally-known camera signal processing on output signals of the image sensors 402-1 to 402-6, respectively, and obtain captured image data.

The integration processing unit 405 includes a first functional unit that functions in a similar manner to the phase control unit included in each camera of the multi-camera systems 10A and 10B (see FIGS. 1 and 7) to correspond to each of the image sensors 402-1 to 402-6. Further, the integration processing unit 405 includes a second functional unit that functions in a similar manner to the central processing apparatus in the multi-camera systems 10A and 10B (see FIGS. 1 and 7).

The integration processing unit 405 processes images (captured images) obtained by imaging an identical subject such as a checker pattern for calibration with the image sensors 402-1 to 402-6 and calculates a gap amount of the captured image of each image sensor from the reference position in the vertical direction. Further, the integration processing unit 405 supplies vertical synchronization signals Vs1 to Vs6 whose phases are shifted according to the gap amounts of the captured images of the image sensors from the reference position in the vertical direction, to the respective image sensors on the basis of information of the gap amounts. Further, the integration processing unit 405 performs stitching processing on the captured image data output from the image sensors 402-1 to 402-6 and obtains synthesized image data.

The output I/F unit 406 is an interface unit for externally outputting the synthesized image data obtained in the integration processing unit 405. For example, the output I/F unit 405 is an HDMI interface unit, a USB interface unit, or the like.

In the multi-eye camera 10F shown in FIG. 14, the phases of the vertical synchronization signals Vs1 to Vs6 supplied to the image sensors 402-1 to 402-6 are respectively shifted according to the information of the gap amounts of the captured images of the respective cameras from the reference position in the vertical direction. Therefore, even if there are variations in arrangement positions of the image sensors 402-1 to 402-6 within the casing 401, when the captured images are stitched and then synthesized, there are no lines with largely different capture times in the vicinity of joints, focal plane distortion is prevented from standing out in the vicinity of those joints, and a favorable synthesized image is obtained.

The example including the six image sensors 402-1 to 402-6 in the multi-eye camera 10F shown in FIG. 14 has been described. Although detailed description will be omitted, the present technology can be similarly applied to a multi-eye camera including not only six image sensors but also other number of image sensors. Further, in the multi-eye camera 10F shown in FIG. 14, the example in which the image sensors 402-1 to 402-6 are fixedly disposed within the casing 401 and all of the image sensors 402-1 to 402-6 are used has been described. However, a configuration in which the arrangement of the image sensors 402-1 to 402-6 may be arbitrarily changed, or a configuration in which part of the image sensors 402-1 to 402-6 can be selectively used is also conceivable. In such a configuration as well, a favorable synthesized image (panoramic image) can be obtained when the present technology is applied.

Further, the present technology can have the following configurations.

(1) A multi-camera system, including:
a plurality of cameras that respectively include image sensors, each of the image sensors outputting a signal by a raster scan scheme; and
a plurality of phase control units that respectively shift phases of a vertical synchronization signal supplied to the image sensors of the plurality of cameras according to information of gap amounts of captured images of the respective cameras from a reference position in a vertical direction.

(2) The multi-camera system according to (1), in which the plurality of phase control units are respectively provided in the plurality of cameras.

(3) The multi-camera system according to (1), in which the plurality of phase control units are respectively provided externally to the plurality of cameras.

(4) The multi-camera system according to any one of (1) to (3), further including
a central control unit that supplies, to the plurality of phase control units, the information of the gap amounts of the captured images of the plurality of cameras from the reference position in the vertical direction.

(5) The multi-camera system according to (4), in which the central control unit processes the captured images of the plurality of cameras and obtains the information of the gap amounts of the captured images of the plurality of cameras from the reference position in the vertical direction.

(6) The multi-camera system according to (4) or (5), in which
any of the plurality of cameras doubles as the central control unit.

(7) The multi-camera system according to any one of (1) to (6), in which
the plurality of cameras are four cameras, and
the four cameras are disposed in a two-by-two matrix including two cameras in a horizontal direction by two cameras in the vertical direction.

(8) The multi-camera system according to any one of (1) to (7), further including
an image processing unit that performs stitching processing on data of the captured images and obtains panoramic image data, the data of the captured images being output from the plurality of cameras.

(9) A method of controlling a multi-camera system, the multi-camera system including a plurality of cameras that respectively include image sensors, each of the image sensors outputting a signal by a raster scan scheme, the method including
shifting phases of a vertical synchronization signal supplied to the image sensors of the plurality of cameras according to information of gap amounts of captured images of the respective cameras from a reference position in a vertical direction.

(10) A camera, including:
a plurality of image sensors that respectively output a signal by a raster scan scheme; and
a phase control unit that shifts phases of a vertical synchronization signal supplied to the plurality of image sensors according to information of gap amounts of captured images of the respective image sensors from a reference position in a vertical direction.

(11) A camera, including:
an image sensor that outputs a signal by a raster scan scheme;
a first input unit that inputs a reference vertical synchronization signal;
a second input unit that inputs phase shift amount information of the vertical synchronization signal; and
a phase control unit that shifts a phase of the reference vertical synchronization signal on the basis of the phase shift amount information and supplies the resultant signal to the image sensor.

(12) The camera according to (11), in which
the image sensor is a CMOS image sensor.

REFERENCE SIGNS LIST 10A, 10B, 10C, 10D, 10E multi-camera system
101-1, 101-2, 101-3, 301-1, 301-2, 301-3, 301-4 camera
102, 302 central control apparatus
103, 303 display apparatus
104-1, 104-2, 104-3, 304-1, 304-2, 304-3, 304-4 phase control unit
105-1, 105-2, 105-3 device for phase control
201 input terminal (terminal for inputting reference vertical synchronization signal such as genlock signal)
202 input terminal (terminal for inputting gap amount information (shift amount information))
203 system clock generation unit
204 phase shift unit
205 control I/F unit
206 image sensor
207 camera signal processing unit
208 output I/F unit
209 captured image data output terminal
401 casing
402-1 to 402-6 image sensor
403-1 to 403-6 lens
404-1 to 404-6 camera signal processing unit
405 integration processing unit
406 output I/F unit

The invention claimed is:

1. A multi-camera system, comprising:
a plurality of cameras, wherein
  each camera of the plurality of cameras comprises an image sensor, and
  each of the image sensor is configured to output a signal by a raster scan scheme;
a plurality of phase control units,
  wherein each phase control unit of the plurality of phase control units is configured to shift a phase of a vertical synchronization signal supplied to the respective image sensor; and
a central control unit configured to supply information of gap amounts, of captured images of the plurality of cameras from a reference position, in a vertical direction, wherein
  the central control unit is configured to supply the information of the gap amounts to the plurality of phase control units, and
  the phase is shifted based on the information of the gap amounts of the captured images.

2. The multi-camera system according to claim 1, wherein the plurality of phase control units is respectively in the plurality of cameras.

3. The multi-camera system according to claim 1, wherein the plurality of phase control units is external to the plurality of cameras.

4. The multi-camera system according to claim 1, wherein the central control unit is further configured to:
  process the captured images of the plurality of cameras; and
  obtain the information of the gap amounts of the captured images based on the process.

5. The multi-camera system according to claim 1, wherein a camera of the plurality of cameras is configured to function as the central control unit.

6. The multi-camera system according to claim 1, wherein the plurality of cameras includes four cameras, and
the four cameras are in a two-by-two matrix including first two cameras in a horizontal direction by second two cameras in the vertical direction.

7. The multi-camera system according to claim 1, further comprising an image processing unit configured to:
  execute stitching process on data of the captured images; and
  obtain panoramic image data based on the stitching process on the data of the captured images,
    wherein the data of the captured images is output from the plurality of cameras.

8. A method of controlling a multi-camera system, comprising:
  outputting, by each image sensor of a plurality of image sensors in the multi-camera system, a signal by a raster scan scheme,
    wherein the plurality of image sensors is in a plurality of cameras in the multi-camera system;
  shifting a phase of a vertical synchronization signal supplied to the respective image sensor; and
  supplying information of gap amounts, of captured images of the plurality of cameras from a reference position, in a vertical direction,
    wherein the phase is shifted based on the information of the gap amounts of the captured images.

9. A camera, comprising:
a plurality of image sensors,
  wherein each image sensor of the plurality of image sensors is configured to output a signal by a raster scan scheme;
a phase control unit configured to shift a phase of a vertical synchronization signal supplied to a respective image sensor of the plurality of image sensors, wherein
  the phase is shifted based on information of gap amounts, of captured images of the plurality of image sensors from a reference position, in a vertical direction, and
  the information of the gap amounts of the captured images is supplied from a central control unit.

10. A camera, comprising:
an image sensor configured to output a signal by a raster scan scheme;
a first input unit configured to input a reference vertical synchronization signal;
a second input unit configured to input phase shift amount information of the vertical synchronization signal, wherein the phase shift amount information is information of gap amounts, of a captured image of the camera from a reference position, in a vertical direction; and
a phase control unit configured to:
  shift a phase of the reference vertical synchronization signal based on the phase shift amount information; and
  supply the phase-shifted reference vertical synchronization signal to the image sensor.

11. The camera according to claim 10, wherein the image sensor is a CMOS image sensor.

* * * * *